(No Model.)
E. A. BRYANT.
ARTIFICIAL TEETH.
No. 434,317. Patented Aug. 12, 1890.
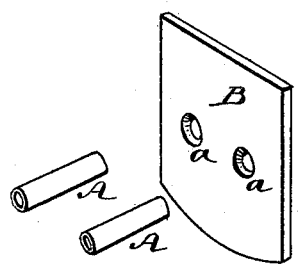
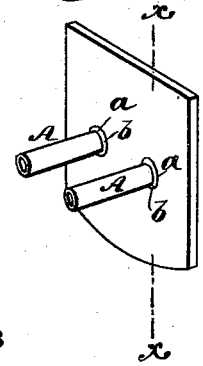
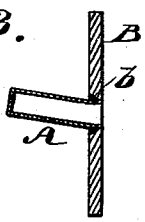
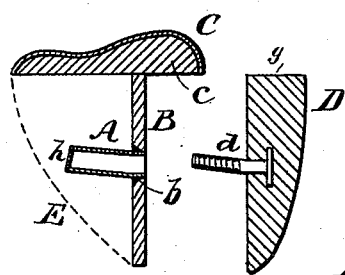
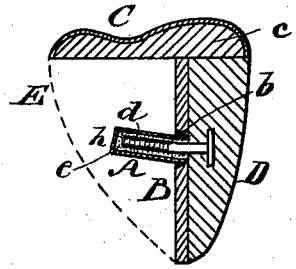
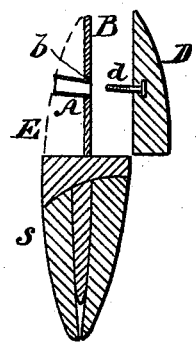
WITNESSES:
INVENTOR:
E. A. Bryant
BY
Munn & Co.
ATTORNEYS

UNITED STATES PATENT OFFICE.

EMORY A. BRYANT, OF ASPEN, COLORADO, ASSIGNOR OF ONE-HALF TO EDWARD P. ROSE, OF SAME PLACE.

ARTIFICIAL TEETH.

SPECIFICATION forming part of Letters Patent No. 434,317, dated August 12, 1890.

Application filed April 21, 1890. Serial No. 348,821. (No model.)

*To all whom it may concern:*

Be it known that I, EMORY A. BRYANT, of Aspen, Pitkin county, in the State of Colorado, have invented a new and useful Improvement in Artificial Teeth, of which the following is a full, clear, and exact description.

This invention relates to the attachment of artificial teeth or porcelain veneer fronts of teeth to the gold, which forms in dentistry what are called "dummies" in bridge-work or "pivot-teeth," also applicable to anterior tooth-abutments for bridges.

The object of my invention is to attach the porcelain veneers of artificial teeth to the dummies or pivot-teeth, so that in case said veneers or facings are broken, fractured, or come off they can be easily replaced without discomfort to the patient wearing the bridge or pivot-teeth, and this without hard or difficult labor by the dentist making the repair.

The invention also serves to lighten the labor and difficulty in making the bridge, and to reduce the amount of apparatus necessary to its manufacture, also to entirely obviate the necessity of having the porcelain veneer facings of artificial teeth attached to the bridge proper, while soldering each tooth separately or soldering them all together. Furthermore, by means of my invention, should one of the porcelain facings come off or be broken, a patient might have such broken or loosened tooth repaired at a small cost, even by a dentist who had little or no experience with bridge-work.

The invention consists in or comprises certain cylinders, tubes, or ferrules adapted to receive and secure the pins attached to the facings, substantially as hereinafter described, and pointed out in the claims, and whereby openings made by a gold-drill are dispensed with for reception of the pins. These cylinders are soldered to the backing of the tooth and gold solder flowed over the whole after the facing is withdrawn.

The work to which my invention is applicable is unlimited as bridge-work itself, and I am enabled to make a perfect joint between the teeth and gold, nor are the porcelain facings subjected to heat in any form. Consequently there is no danger of fracture, as in other work of similar kind.

Reference is to be had to the accompanying drawings, forming a part of this specification, in which similar letters of reference indicate corresponding parts in all the figures.

Figure 1 represents a perspective view of the ferrules or cylinders and of the platinum or other suitable backing to which said cylinders are designed to be attached. Fig. 2 is a perspective view of the backing or plate with the cylinders attached, and Fig. 3 a section of the same upon the line $x\ x$ in Fig. 2. Fig. 4 is a vertical section of a molar dummy tooth for bridge-work, showing the cusp filled with solder, platinum, or other metal backing and cylinder or ferrules attached, also showing, detached, the porcelain facing with attached pin. Fig. 5 is a vertical section of the same with the porcelain facing attached. Fig. 6 is a vertical section of an anterior tooth porcelain facing with pin attached and cylinder and backing waxed in position.

A A are the cylinders or ferrules, made of platinum, gold, or other metal, and which in the first five figures of the drawings are represented as of uniform size or straight, but in Fig. 6 as tapering, increasing in size backward. These cylinders may either be of a longitudinally split construction with their edges soldered together, or be constructed seamless in bulk by pressure. Said cylinders project, slightly inclining upward, back from the platinum, gold, or other metal backing B, to which they are secured by entering them within tapering holes $a\ a$ in the plate or backing and filling said tapering apertures around the cylinders with solder $b$.

C in Figs. 4 and 5 indicates the cusp filled with solder $c$, and D is the porcelain facing having attached pins $d$, one of which only is here shown, designed to enter and engage with the cylinders or ferrules A A by means of a suitable cement filling $e$ within the cylinders.

E indicates the wax closing the whole in rear of the backing B and holding the backing in position. The anterior pivot-tooth shown in Fig. 6, and of which $s$ is the root, is similarly constructed so far as the attachment of the porcelain facing is concerned.

I will now proceed to describe more in detail the construction and mode of proceeding which I generally adopt, and which is in accordance with my invention.

For molar dummies I prefer to select facings with extra long pins and grind down the same evenly at $g$. Then select a molar-cusp die to suit and strike up a cusp C from, say, twenty-two-carat rolled gold plate, about No. 28 American gage, and flow into this cusp enough twenty-carat solder $c$ to fill the cusp even to the top. Then trim off the edges and grind the filled part perfectly flat and smooth. I then take a piece of platinum to form the backing B, No. 26 American gage, and punch holes in it at a right distance apart for the pins $d$ of the facing to enter, and mark off and cut to cover the facing. Put said backing in place on the facing, and burnish down the edges to fit perfectly all round. I then take a piece of platinum of, say, No. 38 American gage, and cut off a ribbon as wide as it is desired to make the length of each cylinder A and wind this around a piece of wire or any instrument which is a trifle larger in diameter than the pins $d$ of the facing, thus forming the cylinder, which is then removed from the wire, a little borax applied to its joint, and soldered with pure gold. The cylinder is then cut off from the ribbon and trimmed up, making it as round as possible. The second cylinder A is then made in like manner. The one end of each cylinder is then pinched together with pliers, so that solder will not flow through, or a piece of platinum may be soldered across one end with pure gold a slight distance beyond where the pins of the facing D will come when in place, as shown at $h$ in Figs. 4 and 5. The holes in the backing B are then enlarged till the cylinders A at their open end will fit in tightly, after which the backing B is placed back on the facing D, which then has its pins straight in cylinders, but inclining slightly upward. I then remove the facing, solder the cylinders to the backing with twenty-carat solder, replace the facing, and fit on cusp C. The whole is then held in place tightly and some hot wax E poured over the cylinders and backing, filling up to same extent as gold is desired on the dummy. Then withdraw carefully the porcelain facing D and take two pins of a smaller size by one-half than the pins of the facing and dip them in a mixture of plaster and water and insert them in the cylinders before the plaster sets, leaving the ends extending outward about one-quarter of an inch, and then insert in a mixture of pumice-stone and plaster in equal parts, covering every part excepting the wax to the thickness of about half an inch, burning out the wax and flowing in eighteen to twenty carat solder to cover the ends of the cylinder sufficiently, so that in finishing up they will not be seen. The whole is then plunged into cold water immediately and pins removed from the cylinders, the cylinders cleaned out, and the gold portion finished up and polished. The facing is then put in place and put in position in the bridge and articulated with antagonizing teeth. When all the dummies are waxed in place, I remove the facings, invert and solder, plunge in cold water while hot, and clean up and polish, After this I serrate the facing-pins, mix cement thin and apply it to the pins, using a little more cement than what is necessary to fill the cylinders, and quickly push each facing home to its proper place. Then quickly clean off surplus cement.

For the anterior teeth the proceedings are nearly the same; but each cylinder used on the backing should be tapered and both ends of the same left open, as shown in Fig. 6. The holes in the backing are countersunk to fit the small ends of the tapering cylinders, and there being no cusp to put on the front does not necessarily have to be ground to place on the bridge. If a facing should break, the pins project far enough from the gold dummies to allow of getting hold of them with pliers and twisting them out, and a new facing, with pins at the right distance apart and of the right length, the color of the facing being correct, is selected, ground to fit, and cemented in place. If the facing simply becomes loosened, it can be cemented in again.

The cylinders or ferrules A may either be made straight or tapered and have their one end closed or both ends left open, as the circumstances of the case require.

Having thus described my invention, I claim as new and desire to secure by Letters Patent—

1. In bridge-work of artificial teeth, substantially as described, a backing for veneer fronts of dummies or pivot-teeth, having attached cylinders or ferrules projecting backwardly from it in communication with and through the backing, as set forth.

2. In bridge-work of artificial teeth, substantially as described, the combination of a metal backing for dummies or pivot-teeth, having attached metal cylinders or ferrules projecting backwardly from it in communication with and through the backing, and a porcelain facing adapted to fit said backing, and provided with pins arranged to enter said backing and cylinders and to be cemented within the latter, as set forth.

3. In bridge-work of artificial teeth, the combination of a backing for dummies or pivot-teeth, having cylinders or ferrules projecting therefrom, a facing fitting upon the backing and provided with pins projecting into the cylinders or ferrules and secured therein, and a cusp on top of the backing and facing, substantially as described.

4. The combination of the cusp C, the apertured back B with its attached cylinders or ferrules A, the facing D with its attached pins $d$, the cement filling $e$, and the wax covering E, substantially as specified.

EMORY A. BRYANT.

Witnesses:
JAMES T. STEWART,
HORACE J. SUBERS.